United States Patent [19]

Bush et al.

[11] Patent Number: 4,979,148
[45] Date of Patent: Dec. 18, 1990

[54] INCREASING OPTIONS IN MAPPING ROM IN COMPUTER MEMORY SPACE

[75] Inventors: Gregory F. Bush, Endicott, N.Y.; Don S. Keener, Boca Raton, Fla.; Jeanne E. Morel, Boca Raton, Fla.; Richard W. Voorhees, Boca Raton, Fla.

[73] Assignee: International Business Machines Corporation, Armonk, N.Y.

[21] Appl. No.: 281,612

[22] Filed: Dec. 9, 1988

[51] Int. Cl.⁵ .................. G06F 12/00; G11C 8/00; G11C 15/00
[52] U.S. Cl. .................. 365/230.01; 365/230.03; 364/244.6; 364/247.2; 364/200
[58] Field of Search .................. 365/230.01, 230.03; 364/200 MS File, 900 MS File

[56] References Cited

U.S. PATENT DOCUMENTS

| | | | |
|---|---|---|---|
| 3,440,615 | 4/1969 | Carter | 340/172.5 |
| 3,921,144 | 11/1975 | Woodrum | 340/172.5 |
| 4,037,215 | 7/1977 | Birney et al. | 364/200 |
| 4,363,095 | 12/1982 | Woods et al. | 364/200 |
| 4,374,411 | 2/1983 | Heatherington | 364/200 |
| 4,378,591 | 3/1983 | Lemay | 364/200 |
| 4,443,847 | 4/1984 | Bradley et al. | 364/200 |
| 4,485,457 | 11/1984 | Balaska et al. | 364/900 |
| 4,507,731 | 3/1985 | Morrison | 364/200 |
| 4,630,230 | 12/1986 | Sundet | 364/200 |
| 4,649,471 | 3/1987 | Briggs et al. | 364/200 |
| 4,675,808 | 6/1987 | Grinn et al. | 364/200 |
| 4,744,053 | 5/1988 | Luhrmann | 365/49 |
| 4,761,736 | 8/1988 | Di Orio | 364/200 |

FOREIGN PATENT DOCUMENTS 3148761 8/1985 Fed. Rep. of Germany.
3812607 10/1988 Fed. Rep. of Germany.

OTHER PUBLICATIONS

"Programmable Option Select", *IBM Personal System/2 Model 50 and 60 Technical Reference Manual*, 1987, pp. 2-21 through 2-46.

*Primary Examiner*—Gareth D. Shaw
*Assistant Examiner*—Gopal C. Ray

[57] ABSTRACT

In order to more effectively use read only memory space of a personal computer system, ROM code is selectively located or mapped to either an address boundary which is an even or odd integer multiple of one half the capacity of the read only memory device in which the ROM code is stored. The ROM code is stored in the read only memory device in two fields. In a first field, the ROM code is broken up into two segments, and the first segment precedes the second segment. In the second field, the same two segments are stored, but the second segment is stored preceding the first segment. A register, for storing page select bits, provides an input to an address decoder and an input to an adder, which adds unity to the contents of the register and provides its outputs to the address decoder as well. Accordingly, the address decoder will respond to either the page which is identified by the page select bits or the page following the identified page. The LSB of the page select bits is used in addressing the read only memory device to select between the first field (selected when the LSB is zero) or the second field (selected when the LSB is unity).

6 Claims, 3 Drawing Sheets

INCREASING OPTIONS IN MAPPING ROM IN COMPUTER MEMORY SPACE

TECHNICAL FIELD

The invention relates to locating or mapping ROM code in computer system memory space.

BACKGROUND ART

Many known computer systems are sold in the form of a basic unit which, however, is expandable by the user. For example, the architecture may include a plurality of card slots in some type of housing where the slots are interconnected by a bus. In such a computer system, a basic unit, may have one or more card slots which are unpopulated. The computer system can be expanded by inserting a component such as an appropriate printed circuit card (or feature card) in an empty slot. Many such feature cards have a personality which is at least partially defined by software stored in a Read Only Memory, hereinafter referred to as ROM code. One of the necessary prerequisites to effectively using such a feature card is the ability for the system as a whole to address the ROM code. Typically, the computer system architecture provides for a read only memory space for ROM code of the computer system, taken as a whole. This read only memory space is not expandable, i.e. all of the ROM code for whatever feature cards are added, as well as the ROM code of the computer system in its basic state, must fit within this read only memory space.

One example of such an expandable computer system is manufactured by International Business Machines Corp. and is sold under the P/S 2 trademark. This family of computer systems includes a configuration utility which can automatically perform certain functions necessary to the utilization of feature cards which are added to the computer system. One of the functions performed by the configuration utility is locating the ROM code of the feature card(s) in the read only memory space in a fashion so as to not interfere with preexisting ROM code which had already been located in the memory space and other ROM code on other feature cards. The configuration utility generally assigns the ROM code to one or more 8K segments in the read only memory space.

The term "locating" as used above, and as it is used in the remainder of this application, does not refer to physically moving any ROM code; the ROM code is physically stored in a memory device on the feature card. The term "locating" refers to assigning an address to the ROM code, i.e. mapping the ROM code in read only memory space.

Because the read only memory space for ROM code is limited, it is important to use that memory space as efficiently as possible.

In the prior art, ROM code was located on a memory boundary whose address was an integer multiple of that portion of memory space required for the capacity of the ROM (not the extent of the ROM code). For example, if the ROM code occupied up to 16K bytes of memory space, that ROM code would be stored in a 16K ROM and the ROM code would be located in the read only memory space beginning at an address which was an integer multiple of 16K. It should be apparent that given the fact that the read only memory space is limited, the necessity for locating the ROM code at such a location could render use of the read only memory space less than efficient. Taking a concrete example, assume the dedicated read only memory space available was limited to 128K, then there are only eight possible locations for a block of 16K ROM code. If, for example, memory space beginning at an address of 24K was available, the read only memory space from 24K to 32K could go unused, and the 16K of ROM code would be located at the 32K address boundary, and occupy addresses from 32K to 48K. On the other hand, if the 16K of ROM code could be located at the address of 24K, then it could employ the address space from 24K to 40K.

Furthermore, while feature cards should provide for freely locating ROM code, it is true that some feature cards require ROM code to be located at specific addresses in read only memory space. It should be apparent that this condition further exacerbates the problem in that it makes it more likely that one or more read only memory space segments are difficult or impossible to use.

In general, prior art location of ROM code was restricted to addresses which were integer multiples of the size of the ROM or, stated differently, even multiples of half the size of the ROM. Boundaries equal to odd integer multiples of half the size of the ROM could not be used.

SUMMARY OF THE INVENTION

Accordingly, it is one object of the invention to eliminate this artificial restriction and allow ROM code to be located at boundaries in the dedicated read only memory space which are sub-multiples of the size of the ROM, i.e. both even and odd integer multiples of half the size of the ROM should be available.

It is another object of the invention to meet the foregoing object without imposing additional circuit delays in addressing, as would otherwise be required to overcome this problem.

In accordance with the invention, the arrangement in which ROM code is stored on the feature card is altered. Whereas in the past only a single copy of the ROM code was stored in the read only memory device (ROM) of the feature card, in accordance with the invention, the ROM code is stored on the feature card in the memory device in two different versions; one version is stored in a first field and a second version is stored in a second field. In a first version, the ROM code is stored exactly as it had been in the past. For purposes of description, we will refer to the ROM code as comprising a first segment and a second segment, and a first field of ROM code stored on the feature card is stored with the first segment followed directly by the second segment. However, the feature card in accordance with the present invention also stores ROM code in a different or second field. In this second field, the second segment of the ROM code precedes the first segment.

Prior art feature cards which are used to expand computer systems such as are described above include at least a multi-bit register. The multi-bit register is used by the configuration utility, and a numerical quantity is stored in the multi-bit register indicating a particular segment of the read only memory space in which the ROM code of the feature card is to be located or mapped. The contents of the register are used as inputs to an address decoder, located on the feature card, so that when a memory region within the read only memory space allocated to the ROM code on the feature card is addressed, the address decoder responds and the appropriate ROM code is read from the memory device on the feature card. In accordance with the present invention, the address decoder is modified in several respects. In a first respect, an adder is provided, with an input from the multi-bit register. The adder output is coupled to the address decoder and to addressing circuitry for the memory device storing the ROM code. The adder is arranged so as to produce an output which is the sum of unity plus the contents of the register. The address decoder is modified so that in addition to responding to the register, it also responds to the output of the adder. Finally, the Least Significant Bit of the register is used to select between the two different fields in the memory device on the feature card storing the ROM code.

A concrete example will be helpful. Assume that the feature card requires 16K of ROM code, the register on the feature card is four bits long, so that we can select 15 of the possible 16 locations within 128K of read only memory space. There are only 15 locations since the 16th location begins at address 120K, which is inadequate to retain the 16K of ROM code. The contents of the register we refer to as the page select bits. Because we are locating 16K of ROM code, it is inadequate to merely decode only on the particular 8K page selected. It is necessary to be able to select the next 8K page. This requirement is satisfied by the presence of the adder.

Given a successful address decode, how will the addresses be realigned to read the appropriate ROM code? If the boundary which is selected for the ROM code is a 16K boundary, there is no problem. On the other hand, if the boundary which is selected is an odd multiple of 8K (not a 16K boundary), then address bit 13 will have the wrong polarity. In other words, as we increment addresses beginning at an odd multiple of 8K, when we have progressed exactly half way through the 16K memory space address bit A13 will change state and it will not address the next successive memory byte.

This problem can be corrected by using the Least Significant Bit of the page select bits. This bit reveals whether an even or odd 8K boundary has been selected. Since the polarity of address bit A13 is reversed on odd boundaries (as compared to even boundaries), that bit can be exclusively OR'ed with the Least Significant page select Bit so that it is only inverted when an odd page has been selected. A disadvantage with this solution is that it places an undesirable delay to the address being presented to the memory device on the feature card containing the ROM code. An alternative which does not have this disadvantage is to use a second copy of the ROM code stored in the memory device, in a different field. This second copy or other field stores exactly the same ROM code as is stored in the first field except that the order of presentation of the ROM code is different. In order to take account of the fact that the bit A13 is of the wrong polarity, the ROM code is broken into two segments. When the ROM code is located on an even boundary, the first field is used wherein the first segment of the ROM code precedes the second segment. On the other hand, when an odd 8K boundary has been selected, the second field of the memory device storing the ROM code is selected. In the second field, the second segment of the ROM code precedes the first. In this fashion, when an odd integer 8K boundary is selected and we increment through the mapped address space, we properly address the second segment of the second field when address bit A13 changes state.

BRIEF DESCRIPTION OF THE DRAWINGS

The present invention will now be described in further detail so as to enable those skilled in the art to make and use the same in connection with the following portion of this specification when taken in conjunction with the attached drawings in which.

DETAILED DESCRIPTION OF PREFERRED EMBODIMENTS

Figure 1:
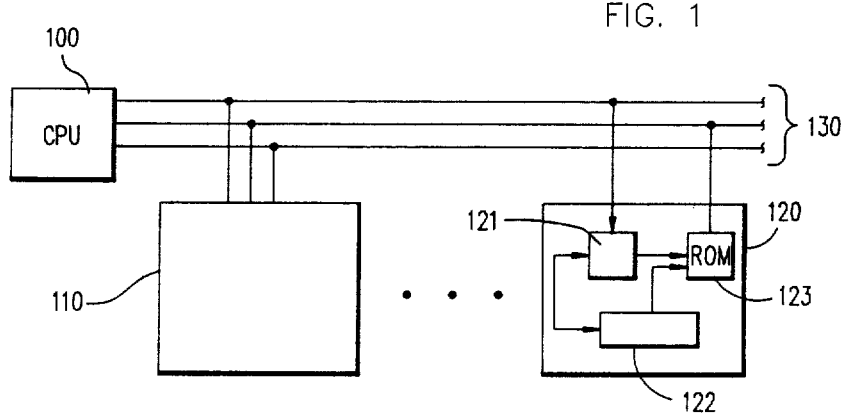
FIG. 1 is a schematic of a typical microcomputer system with which the present invention can be employed.

FIG. 1 is a schematic block diagram of a typical, expandable, computer system. More particularly, as shown in FIG. 1, the computer system includes a CPU 100 which is interconnected to a plurality of components such as the representative component 110 via a multi-component bus 130. The element 120 is intended to represent a feature card or the like which can be inserted into an empty slot in the housing of the computer system for the purposes of expanding the functions of the computer system. While the feature card 120 may have many elements thereon, for the purpose of the present invention, FIG. 1 illustrates that the feature card includes a memory device 123 storing ROM code. The feature card 120 includes a multi-bit register 122 which, during the configuration process, is written with page select bits to locate or map the ROM code stored in the memory device 123 in the read only memory space of the computer system. Finally, the feature card 120 includes addressing logic 121 which is used during the configuration process to write the appropriate contents of the register 122, and, after the configuration process, operates in conjunction with the contents of the register 122 and other information provided by an element of the bus 130 to address memory device 123. Before describing the operation of the foregoing elements of the feature card 120, the various options in locating the ROM code of the memory device 123 will be described in connection with FIGS. 2–6.

Figure 2:
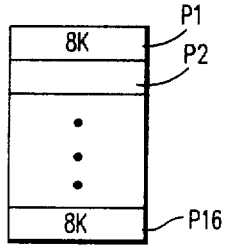
FIG. 2 is a schematic showing the read only memory space of such a microcomputer system.

FIG. 2 is intended to represent the ROM read only memory space in the computer system depicted in FIG. 1. In the example already referred to, the P/S 2 machines provide 128K of read only memory space between the address boundaries (hex) C0000 and DFFFF. This memory space can be considered to include 16 pages P1–P16, each of 8K length. Of these 16 pages, half (P2, P4, etc.) are on odd 8K boundaries. The other half of the segments (P1, P3, etc.) are on even 8K boundaries. Assuming we are attempting to locate 16K of ROM code stored in the memory device 123, then there are 15 (not 16) possible locations. The last location, page P16, cannot be used to locate 16K of ROM code, since its capacity is only 8K. However, each of the other boundaries (the boundaries of P1–P15) can be used to locate a 16K block of ROM code.

Figure 3:
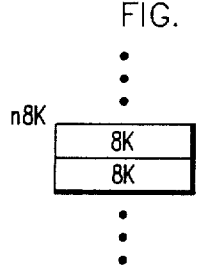
FIGS. 3 and 4 show the locations in the read only memory space of the computer system of FIG. 1 at which the read only code of the memory device 123 can be mapped.
Figure 4:
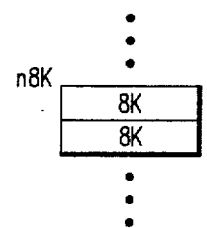

In the event an even 8K boundary is selected (P1, P3) etc.), then the 16K of ROM code will take on the location shown in FIG. 3, on a a boundary n*8K, with n any even integer (0–14). However, in the event the 16K of ROM code is located on an odd boundary (P2, P4–P14), then for reasons which will be explained, the ROM code stored in the memory device 123 will take on the configuration shown in FIG. 4 where n is any odd integer (1–13).

Figure 5:
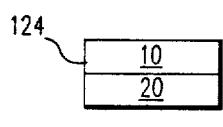
FIGS. 5 and 6 illustrate respectively the contents of the read only memory device of a feature card in accordance with the prior art and in accordance with the present invention, respectively.

FIG. 5 represents the contents of the memory device storing ROM code on a typical feature card in accordance with the prior art. For purposes of description, that ROM code is divided up into segments 10 and 20, although this division is solely for purposes of comparing the prior art to the present invention.

Figure 6:
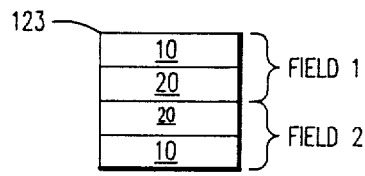

FIG. 6 on the other hand represents the contents of the memory device 123 in accordance with the present invention. As shown in FIG. 6, the contents of the memory device 123 is broken up into fields 1 and 2. Field 1 stores the ROM code in exactly the same manner in which it was stored in a prior art memory device. However, field 2 stores the ROM code in a different order. More particularly, the ROM code has been broken up into two segments, segments 10 and 20. In field 1, these segments are stored in order wherein the first segment 10 precedes the second segment 20. On the other hand, in field 2 the ROM code is stored in a different order wherein the second segment 20 precedes the first segment 10. Segments 10 and 20 of field 2 are otherwise identical to segments 10 and 20 of field 1 and to segments 10 and 20 of the prior art ROM code 124.

Figure 8:
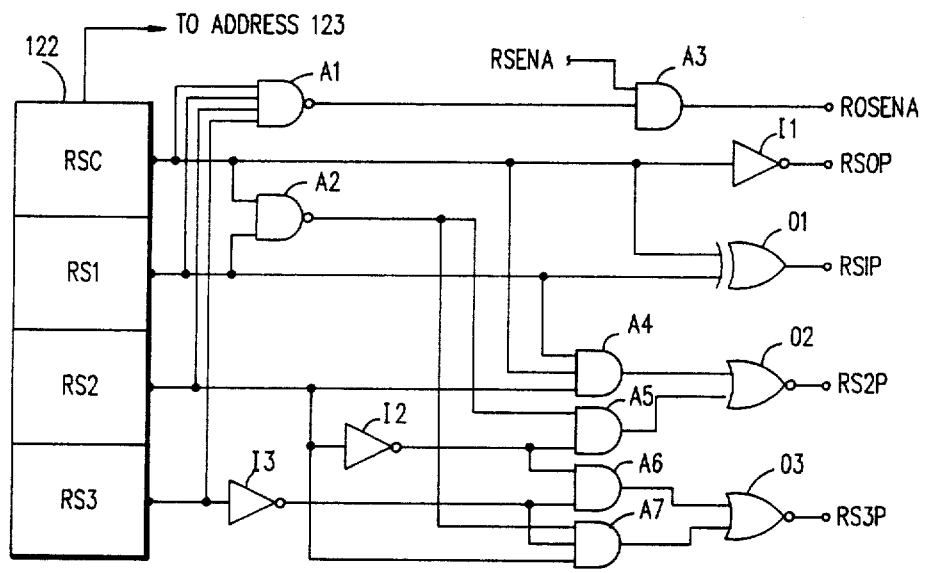
FIG. 8 is a schematic of another portion of the addressing mechanism 121 comprising an adder, and its connection to the register 122 storing the Page Select Bits.

FIG. 8 shows an adder which is employed in the addressing logic 121 for reasons which will be described. The inputs to the adder of FIG. 8 and the page select bits RS0 through RS3 come from the register 122. The outputs of the adder are alternate page select bits RS0P through RS3P, which, regardless of the input, is always one more than the input. The adder includes AND gates A2 and A4–A7, inverters I1–I3 and OR gates 01–03.

Also shown in FIG. 8 is the logic circuit to develop the signal ROSENA (ROS Enable). As shown in FIG. 8, ROSENA is identical to RSENA except in the event that each page select bit RS0–RS3 is 1 (selecting the 15th segment at the boundary DE000). As we have already described, the 15th segment is not an allowable segment within which to place 16K of ROM code. Accordingly, in the event the 15th segment is selected, ROSENA is inhibited by the AND gate A1.

Figure 7:
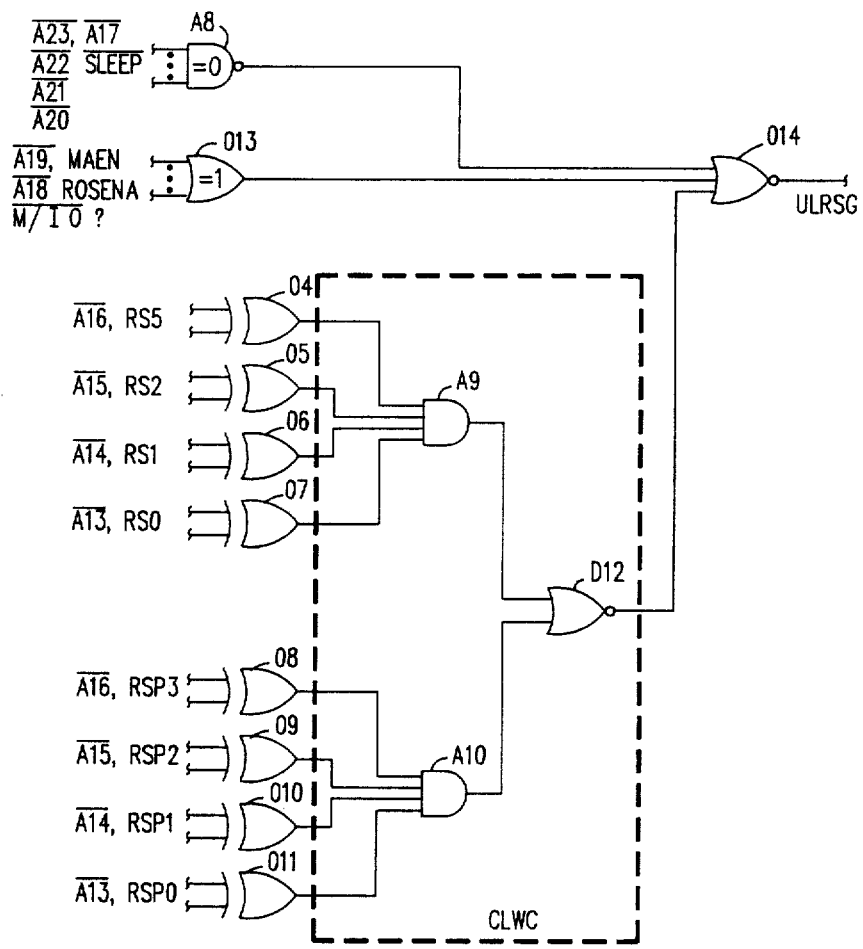
FIG. 7 is a detail of one element of the addressing mechanism 121 in accordance with the present invention.

FIG. 7 is another element of the addressing logic 121. In particular, the circuitry of FIG. 7 is used to enable the memory device 123 when an appropriate address is asserted on the address element of the address bus 130. Of the apparatus shown in FIG. 7, aside from the manner in which ROSENA is developed (as shown in FIG. 8), the gates A8, 013 and their inputs to the gate 014 are entirely conventional as are gates 04–07 and A9. The address mechanism altered by the addition of gates 08–012, A10 and the use of the output of 012 as an input to 014 in lieu of the use of the output of A9. More particularly, gates 04–07 enable gate A9 in the event that the address asserted on the address element of the bus 130 is in the particular page which is selected by the contents of the register 122, i.e. RS0–RS3.

The present invention differs from prior practice by the use of gates 08–012, and A10. Gates 08–011 enable gate A10 in the event that the address element of the bus 130 asserts an address in the page following the page identified by the contents of the register 122, i.e. RS0–RS3.

In the event that the ROM code in the feature card is mapped to an even 8K boundary, then the Least Significant Bit, i.e. RS0, of the page select bits in register 122 will be zero. This bit is used (see FIGS. 8 and 1) to select the first field, i.e. field 1, of the memory device 123. When an address on the address element of the bus 130 is asserted which is in the 8K page identified by the page select bits then gates 04–07 will be satisfied, and assuming the other conditions are in order, gate 014 will produce active Un-Latched ROM Select Good (ULRSG) to enable the memory device 123. Combining the address asserted on the address element of the bus 130 along with the LSB of the register 122 will address the first field of the memory device 123 and any byte within the first segment 10 can be addressed. In the event the address asserted on the address element of the bus 130 goes beyond the first 8K block of ROM code, then gates 08–011 will be satisfied, as will gate A10, to maintain ULRSG active, and a byte within the segment 20 (of field 1) will be addressed. In this fashion, mapping or locating the ROM code on an even 8K boundary provides ROM code addressability in a manner substantially similar to the prior art.

The present invention is particularly useful when the LSB (RS0) of the page select bits in the register 122 is a one, i.e. an odd 8K boundary has been selected.

When the first address byte in this range is asserted on the address element of the bus 130, its bit A13 will be one, and actually gates 08–011 will be satisfied, satisfying gate A10 and again producing an active ULRSG (under the same conditions). With the LSB of register 122 active, field 2 of the memory device 123 will be addressed and the memory byte read will be the first memory byte in segment 10. Assuming that the address asserted on the address element of the bus 130 is continually incremented, at some point the last byte in segment 10, field 2, will be addressed. When the address asserted on the bus is once more incremented, address bit A13 changes from unity to zero. At this point, the gates O8–O11 are inhibited, as is gate A10. On the other hand, at this point, gates O4–O7 will be enabled, enabling gate A9 and thereby maintaining ULRSG active.

Accordingly, when the ROM code is mapped to an odd 8K boundary, addressing will begin in field 2 in segment 10, and as the addresses are incremented, memory device 123 will increment through memory segment 10, of field 2, and once the bytes in segment 10 of field 2 have been addressed, the next byte to be addressed is the first byte in segment 20, field 2. Thereafter, as the address is continued to be incremented, other bytes in segment 20, field 2 will be addressed.

In the preceding portion of this description, use of the present invention for locating or mapping ROM code on a feature card into the read only memory space of a computer system has been described. While the foregoing is a typical description of the use of the invention, the use of the invention is not restricted to feature cards. A typical computer system contains, in addition to feature cards (which may or may not have been sold with the basic system), a planar or mother board. The planar or mother board usually supports the CPU, a read only memory device, addressing apparatus, etc. The present invention can be used on the planar or mother board in exactly the same fashion as has been described for use of the invention on a feature card. By using the present invention on the planar or mother board, the ROM code stored in the read only device on the planar or mother board can be located or mapped in read only memory space of the computer system in the same fashion that the ROM code stored on a feature card is located or mapped, with the same advantages.

What is claimed:

1. A device comprising a component of a personal computer system, said component including read only memory;

said read only memory including two addressable fields, a first addressable field storing read only instruction codes for said component in a given sequential order, said given sequential order comprising a first group of instruction codes followed by a second group of instruction codes, and a second addressable field storing identical instruction codes in a different order, said different order comprising said second group of instruction codes followed by said first group of instruction codes.

2. The device as recited in claim 1 wherein said component is a feature card adapted for plug insertion into the personal computer system.

3. A feature card as recited in claim 2 wherein said first group of instruction codes in said second addressable field is located relative to a beginning of said second addressable field in a position identical to a position of said second group of instruction codes in said first addressable field relative to a beginning of said first addressable field.

4. A method of initializing and addressing a read only memory of a personal computer system which includes read only memory instruction codes for insertion into a programmable region of a read only memory space of said personal computer system, said method comprising the steps of:

(a) storing said read only instruction codes in two distinct fields of said read only memory,
      (i) a first field storing read only instruction codes in a given sequential order, said given sequential order comprising a first group of instruction codes followed by a second group of instruction codes, and
      (ii) a second addressable field storing identical instruction codes in a different order, said different order comprising said second group of instruction codes followed by said first group of instruction codes, (b) determining whether said first or said second field is to be used by determining whether read only memory space is available for said first field,
      (i) if read only memory space is available for said first field then writing a first code to a programmable register and if read only memory space is not available for said first field then writing a different, second, code to said programmable register, and (c) providing address modification logic responsive to address input signals and to a code stored in said programmable register for developing addressing signals for read only memory.

5. A method as recited in claim 4 which includes the further steps of:

modifying address input signals in said address modification logic to produce said addressing signals only in the event said second code is stored in said programmable register.

6. A method of locating feature card resident read only code into read only memory space of a computer system in which said feature card is attached, said method comprising the steps of:

(a) providing said feature card resident read only code in two different fields in feature card resident read only memory,
      (i) a first field storing read only code in a given sequential order, said given sequential order comprising a first group of codes followed by a second group of codes, and
      (ii) a second field storing identical codes in a different order, said different order comprising said second group of codes followed by said first group of codes, (b) storing a read only memory segment indicator identifying a read only memory segment for said feature card resident read only code, said segment indicator having either a first or a second characteristic, (c) in the event said segment indicator has said first characteristic, then addressing said first field and in the event said segment indicator has said second characteristic, then addressing said second field.

* * * * *